Patented Aug. 10, 1943

2,326,258

UNITED STATES PATENT OFFICE 2,326,258

PRODUCTION OF BUTADIENE

Otto Schmidt, Heidelberg-Ziegelhausen, and Sigmund Stadelmann, Ludwigshafen-on-the-Rhine, Germany; vested in the Alien Property Custodian No Drawing. Application June 1, 1940, Serial No. 338,380. In Germany December 19, 1938

5 Claims. (Cl. 260—680)

The present invention relates to an improved process for the production of butadiene-1.3 from butylene.

We have found that butadiene can be prepared in excellent purity by the dehydrogenation of butylene at temperatures above 500° C. This is accomplished by leading normal-butylene in admixture with carbon dioxide and free oxygen through vessels heated to temperatures above 500° C. but below those at which substantial splitting of the carbon chain of the butylene molecule occurs. We prefer to conduct this reaction in the presence of an oxidation catalyst.

Free oxygen and carbon dioxide act jointly on the butylene by favoring the formation of a further double bond and by the elimination of two hydrogen atoms. Due to the presence of oxygen and carbon dioxide, the dehydrogenation of butylene may be carried out at lower temperatures than those necessary for the thermal dehydrogenation in the absence of these gases. When working at comparatively low temperatures, say within the range of from 500 to 600° C., the butadiene obtained is especially pure and most suitable producing polymerization products therefrom. Owing to the presence of oxygen in the reaction mixture, the walls of the reaction vessel and the surface of the catalyst remain free from undesired by-products, such as carbon or polymeric substances, so that according to our invention the reaction may be carried out for a long time without change of the catalyst.

The source of the normal-butylene is immaterial. It may be obtained in any known manner, for example from primary butyl alcohol by dehydration or by dehydrogenation of normal butane or from mixtures of paraffinic hydrocarbons. Though alpha- and beta-butylene are likewise suitable for our method, we prefer the use of beta-butylene.

The oxygen may be admixed to a mixture of butylene and carbon dioxide prior to the introduction into the reaction vessel or within the reaction vessel itself. Oxygen may also be admixed with carbon dioxide prior to its admixture with butylene. The amount of oxygen is preferably so chosen that from 1 to 2 molecular proportions are present in the reaction mixture for 1 molecular proportion of hydrogen split off from butylene. Since the dehydrogenation should be carried out with such a speed of flow that only part of the butylene is converted, the amount of oxygen in the starting mixture actually corresponds only to a fraction of the amount of butylene, e. g. from 0.3 to 0.7 molecular proportion for 1 molecular proportion of butylene at a rate of conversion of 25 per cent. Generally speaking, the rate of conversion should be within the range of 15 to 30 per cent.

The amount of carbon dioxide present in the reaction mixture should be at least equimolecular to the amount of oxygen used. Preferably, an excess of carbon dioxide with reference to oxygen should be used, for example from 2 to 4 or more molecular proportions for one molecular proportion of oxygen. The carbon dioxide favors the dehydrogenating action of oxygen in contrast to other inert diluent gases, it avoids the formation of explosions and it simultaneously acts as dehydrating agent itself, thereby being reduced to carbon monoxide.

It is self understood that other diluent gases such as nitrogen, steam or carbon monoxide may be used in addition to carbon dioxide and oxygen.

Suitable oxidation catalysts are in particular the difficulty reducible oxides of the metals of the fifth and sixth group of the periodic table and the salts derived from the acids of these metals. Among the oxides which have been found to be especially suitable there may be mentioned oxides of vanadium, molybdenum, chromium and tungsten, in particular vanadic, molybdic, chromic or tungstic acid or their salts alone or in admixture with one another. Suitable salts are for example the alkali metal or alkaline earth metal salts or the salts of aluminum, zinc or cadmium of vanadic, chromic, molybdic and tungstic acids. Suitable catalysts are also the oxygen acids of manganese and their salts. These catalysts may be used alone or applied to carrier substances, such as pumice stone, fused silica and the like or zinc oxide and aluminum oxide.

The use of pressures below or in excess of atmospheric pressure is not excluded from practicing our invention, though no particular advantage is achieved thereby.

The following example will serve to illustrate how our invention may be carried out in practice but the invention is not restricted to this example.

*Example*

A mixture consisting of 1 part by volume of beta-butylene, from 0.8 to 3 parts by volume of carbon dioxide and 0.4 part by volume of oxygen is led at 540° C. through a tube made from V2A steel charged with zinc vanadate. The speed of flow is so chosen that from 100 to 300 parts by volume of butylene are passed per hour over 1 part by volume of the catalyst. The gases emerging from the tube are cooled to about 30° C. and then washed with water under superatmospheric pressure to remove carbon dioxide. After having removed small amounts of carbon monoxide, the gas is treated with an aqueous solution of cuprous chloride and ammonium chloride in order to separate the butadiene formed from unchanged butylene which is not absorbed and can be led back for further dehydrogenation.

In one throughput from 15 to 25 per cent of butylene are thus converted into butadiene with a yield of 75 per cent calculated on the amount of butylene converted.

What we claim is:

1. A process for the production of butadiene which consists in leading butylene in admixture with oxygen and carbon dioxide over an oxidation catalyst at temperatures exceeding 500° C. but below those at which substantial splitting of the carbon chain occurs at a speed that only part of the butylene is converted, the amount of oxygen admixed with the butylene being from 1 to 2 molecular proportions for each molecular proportion of hydrogen split off and the amount of carbon dioxide being at least equimolecular to the amount of oxygen.

2. A process for the production of butadiene which consists in leading one molecular proportion of butylene in admixture with from 0.3 to 0.7 molecular proportion of oxygen and with an amount of carbon dioxide at least equimolecular to the amount of oxygen over an oxidation catalyst at temperatures exceeding 500° C. but below those at which substantial splitting of the carbon chain occurs at a speed that from 15 to 30 per cent of butylene are converted.

3. A process for the production of butadiene which consists in leading one molecular proportion of butylene in admixture with from 0.3 to 0.7 molecular proportion of oxygen and with an amount of carbon dioxide at least equimolecular to the amount of oxygen over an oxidation catalyst at temperatures between 500° and 600° C. at a speed that from 15 to 30 per cent of butylene are converted.

4. A process for the production of butadiene which consists in leading one molecular proportion of butylene in admixture with from 0.3 to 0.7 molecular proportion of oxygen and with an amount of carbon dioxide at least equimolecular to the amount of oxygen over an oxidation catalyst comprising an oxygen compound of a metal of the six group of the periodic table at temperatures between 500° and 600° C. at a speed that from 15 to 30 per cent of butylene are converted.

5. A process for the production of butadiene which consists in leading one molecular proportion of butylene in admixture with from 0.3 to 0.7 molecular proportion of oxygen and with an amount of carbon dioxide at least equimolecular to the amount of oxygen over an oxidation catalyst comprising an oxygen compound of vanadium at temperatures between 500° and 600° C. at a speed that from 15 to 30 per cent of butylene are converted.

OTTO SCHMIDT.
SIGMUND STADELMANN.